US012681763B2

(12) United States Patent
Desai et al.

(10) Patent No.: US 12,681,763 B2
(45) Date of Patent: Jul. 14, 2026

(54) DYNAMIC MICROSERVICES ALLOCATION MECHANISM

(71) Applicant: Intel Corporation, Santa Clara, CA (US)

(72) Inventors: Soham Jayesh Desai, Hillsboro, OR (US); Reshma Lal, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 18/539,516

(22) Filed: Dec. 14, 2023

(65) Prior Publication Data

US 2024/0160488 A1 May 16, 2024

Related U.S. Application Data

(62) Division of application No. 17/304,657, filed on Jun. 24, 2021, now Pat. No. 11,861,406.

(51) Int. Cl.
| *G06F 9/50* | (2006.01) |
| *G06F 9/445* | (2018.01) |
| *G06F 9/48* | (2006.01) |
| *G06F 21/60* | (2013.01) |
| *G06F 21/72* | (2013.01) |

(52) U.S. Cl.
CPC ........ G06F 9/5038 (2013.01); G06F 9/44505 (2013.01); G06F 9/4881 (2013.01); G06F 21/602 (2013.01); G06F 21/72 (2013.01)

(58) Field of Classification Search
CPC ................................... G06F 9/5038

USPC .......................................................... 718/104
See application file for complete search history.

(56) References Cited

U.S. PATENT DOCUMENTS

| | | | |
|---|---|---|---|
| 8,095,929 B1 | 1/2012 | Ji et al. | |
| 11,669,367 B2 * | 6/2023 | Castinado | G06F 9/5005 |
| | | | 718/104 |
| 11,792,330 B2 * | 10/2023 | Baum | H04M 11/04 |
| | | | 709/226 |
| 2005/0198303 A1 * | 9/2005 | Knauerhase | G06F 9/5055 |
| | | | 709/227 |
| 2014/0074973 A1 | 3/2014 | Kumar et al. | |
| 2015/0120928 A1 * | 4/2015 | Gummaraju | H04L 67/1008 |
| | | | 718/1 |
| 2021/0224110 A1 * | 7/2021 | Yu | G06F 9/4887 |

FOREIGN PATENT DOCUMENTS

| | | | |
|---|---|---|---|
| CN | 114500521 | * | 11/2022 |
| TW | I651667 B | | 2/2019 |
| WO | 2022271223 A1 | | 12/2022 |

OTHER PUBLICATIONS

International Search Report and Written Opinion for PCT/US22/20027 mailed Jun. 20, 2022, 10 pages.

(Continued)

*Primary Examiner* — Charlie Sun
(74) *Attorney, Agent, or Firm* — JAFFERY WATSON HAMILTON & DESANCTIS LLP

(57) ABSTRACT

A computing platform comprising a plurality of disaggregated data center resources and an infrastructure processing unit (IPU), communicatively coupled to the plurality of resources, to compose a platform of the plurality of disaggregated data center resources for allocation of microservices cluster.

12 Claims, 13 Drawing Sheets

(56)        References Cited

OTHER PUBLICATIONS

Prodan R et al: "A survey and taxonomy of infrastructure as a service and web hosting cloud providers", Grid Computing, 2009 10TH IEEE/ACM International Conference on, IEEE, Piscataway, NJ, USA, Oct. 13, 2009 (Oct. 13, 2009), pp. 17-25, XP031580147.

Notification of TW Publication for TW202301118, 3 pages, Jan. 5, 2023.

Notice of Allowance for U.S. Appl. No. 17/304,657, mailed Aug. 21, 2023, 6 pages.

International Preliminary Report on Patentability for PCT/US22/20027 mailed Jan. 4, 2024, 8 pages.

Notice of Examination Opinion from the Intellectual Property Office of the Ministry of Economic Affairs and Search Report of Taiwan Patent Application No. 111108828 mailed Aug. 1, 2025, 16 pages. (including English Translation).

TW Application No. 111108828 Notice of Allowance issued Dec. 30, 2025, 3 pages. English translation provided.

* cited by examiner

PROVISION RESOURCES

1010

DISCOVER RESOURCES

1020

TRANSMIT TO ORCHESTRATOR CONTROLLER

1030

IDENTITY PROVISIONING

1040

MICROSERVICE CONTROLLER RECEIVES NODE CONFIGURATION

1110

MICROSERVICE CONTROLLER FINDS AVAILABLE RESOURCES

1120

IPU RECEIVES CONFIGURATION INFORMATION

1130

IPU EXPOSES ACCELERATOR

1140

IPU TRANSMITS MESSAGE TO MICROSERVICE CONTROLLER

1150

IPU RECEIVES SPECIFICATION INFORMATION

1160

IPU PULLS IMAGES

1170

IPU VERIFIES IMAGES

1180

IPU TRASNMITS IMAGES TO ACCELERATOR

1190

DYNAMIC MICROSERVICES ALLOCATION MECHANISM

CROSS REFERENCE TO RELATED APPLICATIONS

The present patent application is a divisional application claiming priority from U.S. application Ser. No. 17/304,657, filed Jun. 24, 2021, the contents of which are incorporated herein in their entirety by reference.

BACKGROUND

Modern computing devices may include general-purpose processor cores as well as a variety of hardware accelerators for offloading compute-intensive workloads or performing specialized tasks. Hardware accelerators may include, for example, one or more field-programmable gate arrays (FP-GAs) which may include programmable digital logic resources that may be configured by the end user or system integrator. Hardware accelerators may also include one or more application-specific integrated circuits (ASICs). Hardware accelerators may be embodied as I/O devices that communicate with a processor core over an I/O interconnect. Additionally, hardware accelerators may include one or more graphics processing units (GPUs) implemented to process graphics data.

For efficient use of datacenter resources and to meet the demands of large computations, there is a trend towards disaggregated computing where the compute resources needed by a workload (e.g., central processing unit (CPU), accelerators, storage etc.) may not be on the same physical platform, but instead are connected over network. This approach is enabled due to vast improvements in network throughput and latency over the last several years. This provides several benefits to cloud service providers (CSPs), such as better resource utilization resulting in lower total cost of ownership, great scalability, vendor flexibility, etc.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
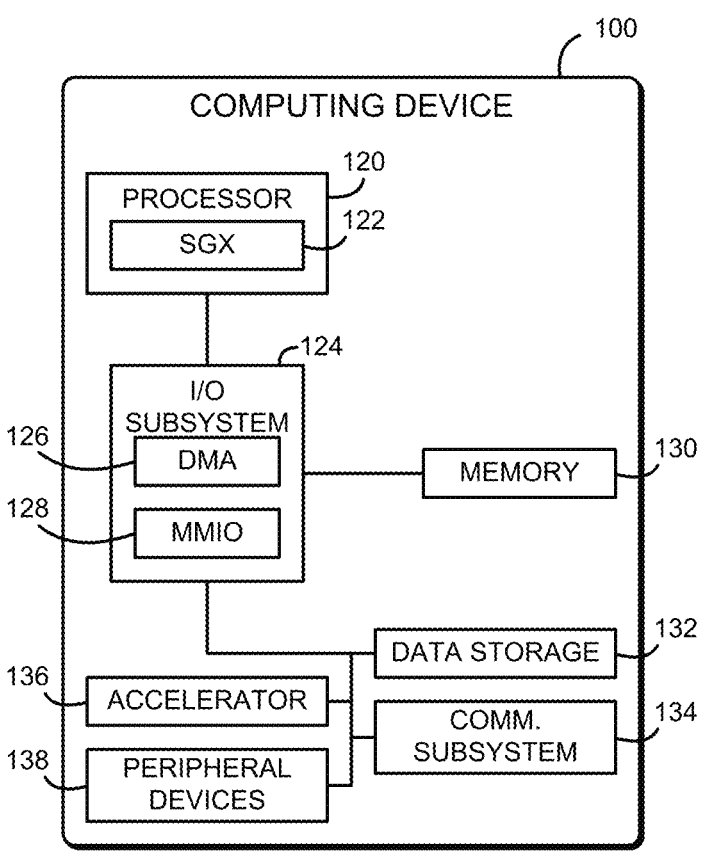
FIG. 1 is a simplified block diagram of at least one embodiment of a computing device for secure I/O with an accelerator device.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a computing device 100 for secure I/O with an accelerator device includes a processor 120 and an accelerator device 136, such as a field-programmable gate array (FPGA). In use, as described further below, a trusted execution environment (TEE) established by the processor 120 securely communicates data with the accelerator 136. Data may be transferred using memory-mapped I/O (MMIO) transactions or direct memory access (DMA)

transactions. For example, the TEE may perform an MMIO write transaction that includes encrypted data, and the accelerator 136 decrypts the data and performs the write. As another example, the TEE may perform an MMIO read request transaction, and the accelerator 136 may read the requested data, encrypt the data, and perform an MMIO read response transaction that includes the encrypted data. As yet another example, the TEE may configure the accelerator 136 to perform a DMA operation, and the accelerator 136 performs a memory transfer, performs a cryptographic operation (i.e., encryption or decryption), and forwards the result. As described further below, the TEE and the accelerator 136 generate authentication tags (ATs) for the transferred data and may use those ATs to validate the transactions. The computing device 100 may thus keep untrusted software of the computing device 100, such as the operating system or virtual machine monitor, outside of the trusted code base (TCB) of the TEE and the accelerator 136. Thus, the computing device 100 may secure data exchanged or otherwise processed by a TEE and an accelerator 136 from an owner of the computing device 100 (e.g., a cloud service provider) or other tenants of the computing device 100. Accordingly, the computing device 100 may improve security and performance for multi-tenant environments by allowing secure use of accelerator devices.

The computing device 100 may be embodied as any type of device capable of performing the functions described herein. For example, the computing device 100 may be embodied as, without limitation, a computer, a laptop computer, a tablet computer, a notebook computer, a mobile computing device, a smartphone, a wearable computing device, a multiprocessor system, a server, a workstation, and/or a consumer electronic device. As shown in FIG. 1, the illustrative computing device 100 includes a processor 120, an I/O subsystem 124, a memory 130, and a data storage device 132. Additionally, in some embodiments, one or more of the illustrative components may be incorporated in, or otherwise form a portion of, another component. For example, the memory 130, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. As shown, the processor 120 illustratively includes secure enclave support 122, which allows the processor 120 to establish a trusted execution environment known as a secure enclave, in which executing code may be measured, verified, and/or otherwise determined to be authentic. Additionally, code and data included in the secure enclave may be encrypted or otherwise protected from being accessed by code executing outside of the secure enclave. For example, code and data included in the secure enclave may be protected by hardware protection mechanisms of the processor 120 while being executed or while being stored in certain protected cache memory of the processor 120. The code and data included in the secure enclave may be encrypted when stored in a shared cache or the main memory 130. The secure enclave support 122 may be embodied as a set of processor instruction extensions that allows the processor 120 to establish one or more secure enclaves in the memory 130. For example, the secure enclave support 122 may be embodied as Intel® Software Guard Extensions (SGX) technology.

The memory 130 may be embodied as any type of volatile or non-volatile memory or data storage capable of performing the functions described herein. In operation, the memory 130 may store various data and software used during operation of the computing device 100 such as operating systems, applications, programs, libraries, and drivers. As shown, the memory 130 may be communicatively coupled to the processor 120 via the I/O subsystem 124, which may be embodied as circuitry and/or components to facilitate input/output operations with the processor 120, the memory 130, and other components of the computing device 100. For example, the I/O subsystem 124 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations. In some embodiments, the memory 130 may be directly coupled to the processor 120, for example via an integrated memory controller hub. Additionally, in some embodiments, the I/O subsystem 124 may form a portion of a system-on-a-chip (SoC) and be incorporated, along with the processor 120, the memory 130, the accelerator device 136, and/or other components of the computing device 100, on a single integrated circuit chip. Additionally, or alternatively, in some embodiments the processor 120 may include an integrated memory controller and a system agent, which may be embodied as a logic block in which data traffic from processor cores and I/O devices converges before being sent to the memory 130.

As shown, the I/O subsystem 124 includes a direct memory access (DMA) engine 126 and a memory-mapped I/O (MMIO) engine 128. The processor 120, including secure enclaves established with the secure enclave support 122, may communicate with the accelerator device 136 with one or more DMA transactions using the DMA engine 126 and/or with one or more MMIO transactions using the MMIO engine 128. The computing device 100 may include multiple DMA engines 126 and/or MMIO engines 128 for handling DMA and MMIO read/write transactions based on bandwidth between the processor 120 and the accelerator 136. Although illustrated as being included in the I/O subsystem 124, it should be understood that in some embodiments the DMA engine 126 and/or the MMIO engine 128 may be included in other components of the computing device 100 (e.g., the processor 120, memory controller, or system agent), or in some embodiments may be embodied as separate components.

The data storage device 132 may be embodied as any type of device or devices configured for short-term or long-term storage of data such as, for example, memory devices and circuits, memory cards, hard disk drives, solid-state drives, non-volatile flash memory, or other data storage devices. The computing device 100 may also include a communications subsystem 134, which may be embodied as any communication circuit, device, or collection thereof, capable of enabling communications between the computing device 100 and other remote devices over a computer network (not shown). The communications subsystem 134 may be configured to use any one or more communication technology (e.g., wired or wireless communications) and associated protocols (e.g., Ethernet, Bluetooth®, Wi-Fi®, WiMAX, 3G, 4G LTE, etc.) to effect such communication.

The accelerator device 136 may be embodied as a field-programmable gate array (FPGA), an application-specific integrated circuit (ASIC), a coprocessor, or other digital logic device capable of performing accelerated functions (e.g., accelerated application functions, accelerated network functions, or other accelerated functions), GPUs, etc. Illustratively, the accelerator device 136 is an FPGA, which may be embodied as an integrated circuit including programmable digital logic resources that may be configured after manufacture. The FPGA may include, for example, a configurable array of logic blocks in communication over a configurable data interchange. The accelerator device 136 may be coupled to the processor 120 via a high-speed connection interface such as a peripheral bus (e.g., a PCI Express bus) or an inter-processor interconnect (e.g., an in-die interconnect (IDI) or QuickPath Interconnect (QPI)), or via any other appropriate interconnect. The accelerator device 136 may receive data and/or commands for processing from the processor 120 and return results data to the processor 120 via DMA, MMIO, or other data transfer transactions.

As shown, the computing device 100 may further include one or more peripheral devices 138. The peripheral devices 138 may include any number of additional input/output devices, interface devices, hardware accelerators, and/or other peripheral devices. For example, in some embodiments, the peripheral devices 138 may include a touch screen, graphics circuitry, a graphical processing unit (GPU) and/or processor graphics, an audio device, a microphone, a camera, a keyboard, a mouse, a network interface, and/or other input/output devices, interface devices, and/or peripheral devices.

Figure 2:
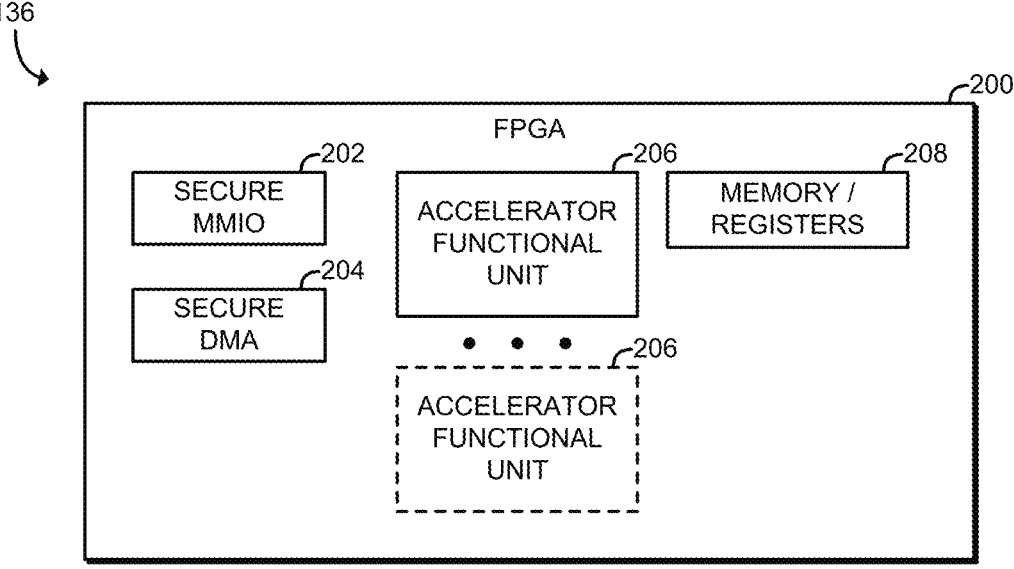
FIG. 2 is a simplified block diagram of at least one embodiment of an accelerator device of the computing device of FIG. 1.

Referring now to FIG. 2, an illustrative embodiment of a field-programmable gate array (FPGA) 200 is shown. As shown, the FPGA 200 is one potential embodiment of an accelerator device 136. The illustratively FPGA 200 includes a secure MMIO engine 202, a secure DMA engine 204, one or more accelerator functional units (AFUs) 206, and memory/registers 208. As described further below, the secure MMIO engine 202 and the secure DMA engine 204 perform in-line authenticated cryptographic operations on data transferred between the processor 120 (e.g., a secure enclave established by the processor) and the FPGA 200 (e.g., one or more AFUs 206). In some embodiments, the secure MMIO engine 202 and/or the secure DMA engine 204 may intercept, filter, or otherwise process data traffic on one or more cache-coherent interconnects, internal buses, or other interconnects of the FPGA 200.

Each AFU 206 may be embodied as logic resources of the FPGA 200 that are configured to perform an acceleration task. Each AFU 206 may be associated with an application executed by the computing device 100 in a secure enclave or other trusted execution environment. Each AFU 206 may be configured or otherwise supplied by a tenant or other user of the computing device 100. For example, each AFU 206 may correspond to a bitstream image programmed to the FPGA 200. As described further below, data processed by each AFU 206, including data exchanged with the trusted execution environment, may be cryptographically protected from untrusted components of the computing device 100 (e.g., protected from software outside of the trusted code base of the tenant enclave). Each AFU 206 may access or otherwise process stored in the memory/registers 208, which may be embodied as internal registers, cache, SRAM, storage, or other memory of the FPGA 200. In some embodiments, the memory 208 may also include external DRAM or other dedicated memory coupled to the FPGA 200.

Figure 3:
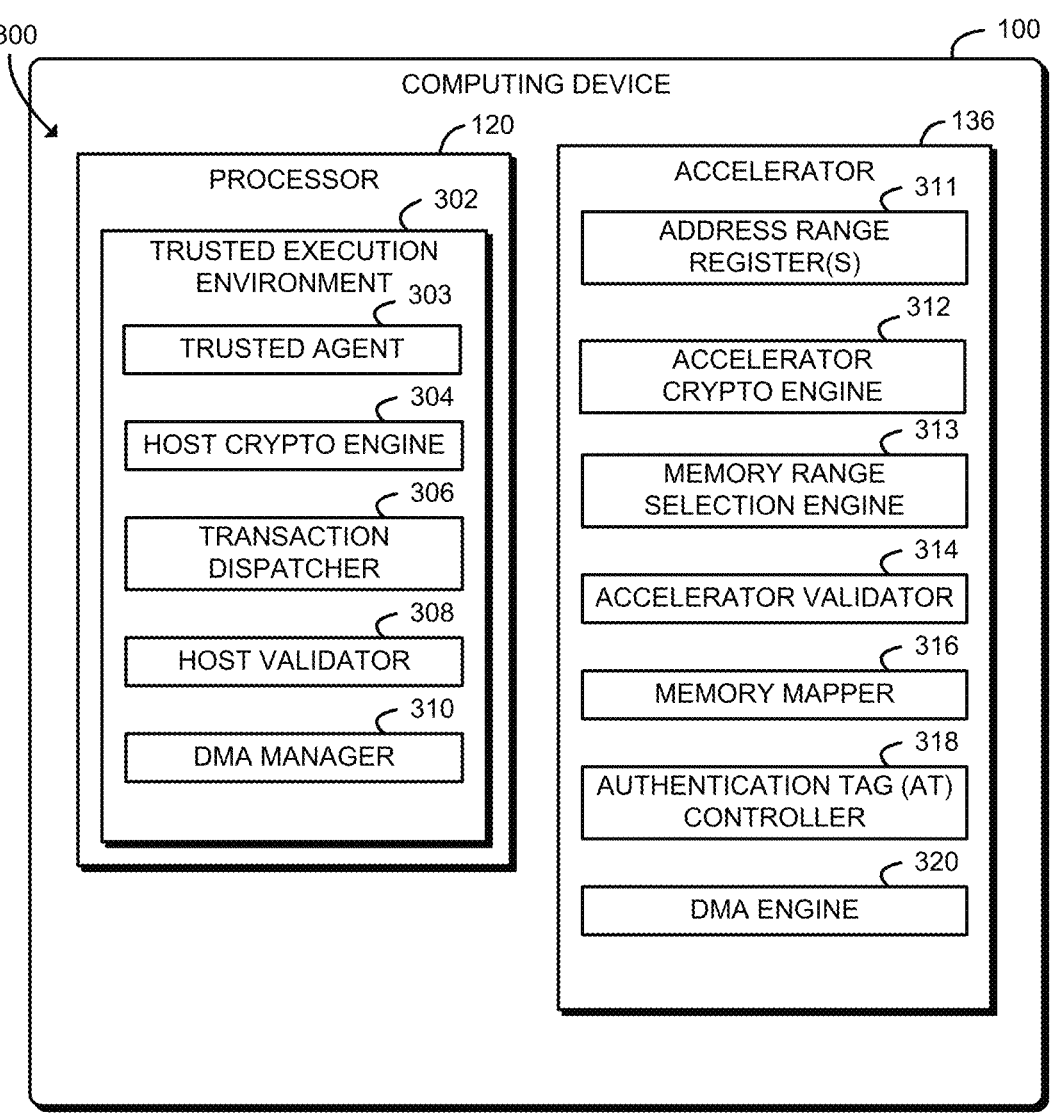
FIG. 3 is a simplified block diagram of at least one embodiment of an environment of the computing device of FIGS. 1 and 2.

Referring now to FIG. 3, in an illustrative embodiment, the computing device 100 establishes an environment 300 during operation. The illustrative environment 300 includes a trusted execution environment (TEE) 302 and the accelerator 136. The TEE 302 further includes a host cryptographic engine 304, a transaction dispatcher 306, a host validator 308, and a direct memory access (DMA) manager 310. The accelerator 136 includes an accelerator cryptographic engine 312, an accelerator validator 314, a memory mapper 316, an authentication tag (AT) controller 318, and a DMA engine 320. The various components of the environment 300 may be embodied as hardware, firmware, software, or a combination thereof. As such, in some embodiments, one or more of the components of the environment 300 may be embodied as circuitry or collection of electrical devices (e.g., host cryptographic engine circuitry 304, transaction dispatcher circuitry 306, host validator circuitry 308, DMA manager circuitry 310, accelerator cryptographic engine circuitry 312, accelerator validator circuitry 314, memory mapper circuitry 316, AT controller circuitry 318, and/or DMA engine circuitry 320). It should be appreciated that, in such embodiments, one or more of the host cryptographic engine circuitry 304, the transaction dispatcher circuitry 306, the host validator circuitry 308, the DMA manager circuitry 310, the accelerator cryptographic engine circuitry 312, the accelerator validator circuitry 314, the memory mapper circuitry 316, the AT controller circuitry 318, and/or the DMA engine circuitry 320 may form a portion of the processor 120, the I/O subsystem 124, the accelerator 136, and/or other components of the computing device 100. Additionally, in some embodiments, one or more of the illustrative components may form a portion of another component and/or one or more of the illustrative components may be independent of one another.

The TEE 302 may be embodied as a trusted execution environment of the computing device 100 that is authenticated and protected from unauthorized access using hardware support of the computing device 100, such as the secure enclave support 122 of the processor 120. Illustratively, the TEE 302 may be embodied as one or more secure enclaves established using Intel SGX technology. The TEE 302 may also include or otherwise interface with one or more drivers, libraries, or other components of the computing device 100 to interface with the accelerator 136.

The host cryptographic engine 304 is configured to generate an authentication tag (AT) based on a memory-mapped I/O (MMIO) transaction and to write that AT to an AT register of the accelerator 136. For an MMIO write request, the host cryptographic engine 304 is further configured to encrypt a data item to generate an encrypted data item, and the AT is generated in response to encrypting the data item. For an MMIO read request, the AT is generated based on an address associated with MMIO read request.

The transaction dispatcher 306 is configured to dispatch the memory-mapped I/O transaction (e.g., an MMIO write request or an MMIO read request) to the accelerator 136 after writing the calculated AT to the AT register. An MMIO write request may be dispatched with the encrypted data item.

The host validator 308 may be configured to verify that an MMIO write request succeeded in response dispatching the MMIO write request. Verifying that the MMIO write request succeeded may include securely reading a status register of the accelerator 136, securely reading a value at the address of the MMIO write from the accelerator 136, or reading an AT register of the accelerator 136 that returns an AT value calculated by the accelerator 136, as described below. For MMIO read requests, the host validator 308 may be further configured to generate an AT based on an encrypted data item included in a MMIO read response dispatched from the accelerator 136; read a reported AT from a register of the accelerator 136; and determine whether the AT generated by the TEE 302 matches the AT reported by the accelerator 136.

The host validator 308 may be further configured to indicate an error if those ATs do not match, which provides assurance that data was not modified on the way from the TEE 302 to the accelerator 136.

The accelerator cryptographic engine 312 is configured to perform a cryptographic operation associated with the MMIO transaction and to generate an AT based on the MMIO transaction in response to the MMIO transaction being dispatched. For an MMIO write request, the cryptographic operation includes decrypting an encrypted data item received from the TEE 302 to generate a data item, and the AT is generated based on the encrypted data item. For an MMIO read request, the cryptographic operation includes encrypting a data item from a memory of the accelerator 136 to generate an encrypted data item, and the AT is generated based on that encrypted data item.

The accelerator validator 314 is configured to determine whether the AT written by the TEE 302 matches the AT determined by the accelerator 136. The accelerator validator 314 is further configured to drop the MMIO transaction if those ATs do not match. For MMIO read requests, the accelerator validator 314 may be configured to generate a poisoned AT in response to dropping the MMIO read request, and may be further configured to dispatch a MMIO read response with a poisoned data item to the TEE 302 in response to dropping the MMIO read request.

The memory mapper 316 is configured to commit the MMIO transaction in response to determining that the AT written by the TEE 302 matches the AT generated by the accelerator 136. For an MMIO write request, committing the transaction may include storing the data item in a memory of the accelerator 136. The memory mapper 316 may be further configured to set a status register to indicate success in response to storing the data item. For an MMIO read request, committing the transaction may include reading the data item at the address in the memory of the accelerator 136 and dispatching an MMIO read response with the encrypted data item to the TEE 302.

The DMA manager 310 is configured to securely write an initialization command to the accelerator 136 to initialize a secure DMA transfer. The DMA manager 310 is further configured to securely configure a descriptor indicative of a host memory buffer, an accelerator 136 buffer, and a transfer direction. The transfer direction may be host to accelerator 136 or accelerator 136 to host. The DMA manager 310 is further configured to securely write a finalization command to the accelerator 136 to finalize an authentication tag (AT) for the secure DMA transfer. The initialization command, the descriptor, and the finalization command may each be securely written and/or configured with an MMIO write request. The DMA manager 310 may be further configured to determine whether to transfer additional data in response to securely configuring the descriptor, the finalization command may be securely written in response to determining that no additional data remains for transfer.

The AT controller 318 is configured to initialize an AT in response to the initialization command from the TEE 302. The AT controller 318 is further configured to finalize the AT in response to the finalization command from the TEE 302.

The DMA engine 320 is configured to transfer data between the host memory buffer and the accelerator 136 buffer in response to the descriptor from the TEE 302. For a transfer from host to accelerator 136, transferring the data includes copying encrypted data from the host memory buffer and forwarding the plaintext data to the accelerator 136 buffer in response to decrypting the encrypted data. For a transfer from accelerator 136 to host, transferring the data includes copying plaintext data from the accelerator 136 buffer and forwarding encrypted data to the host memory buffer in response encrypting the plaintext data.

The accelerator cryptographic engine 312 is configured to perform a cryptographic operation with the data in response to transferring the data and to update the AT in response to transferring the data. For a transfer from host to accelerator 136, performing the cryptographic operation includes decrypting encrypted data to generate plaintext data. For a transfer from accelerator 136 to host, performing the cryptographic operation includes encrypting plaintext data to generate encrypted data.

The host validator 308 is configured to determine an expected AT based on the secure DMA transfer, to read the AT from the accelerator 136 in response to securely writing the finalization command, and to determine whether the AT from the accelerator 136 matches the expected AT. The host validator 308 may be further configured to indicate success if the ATs match and to indicate failure if the ATs do not match.

Figure 4:
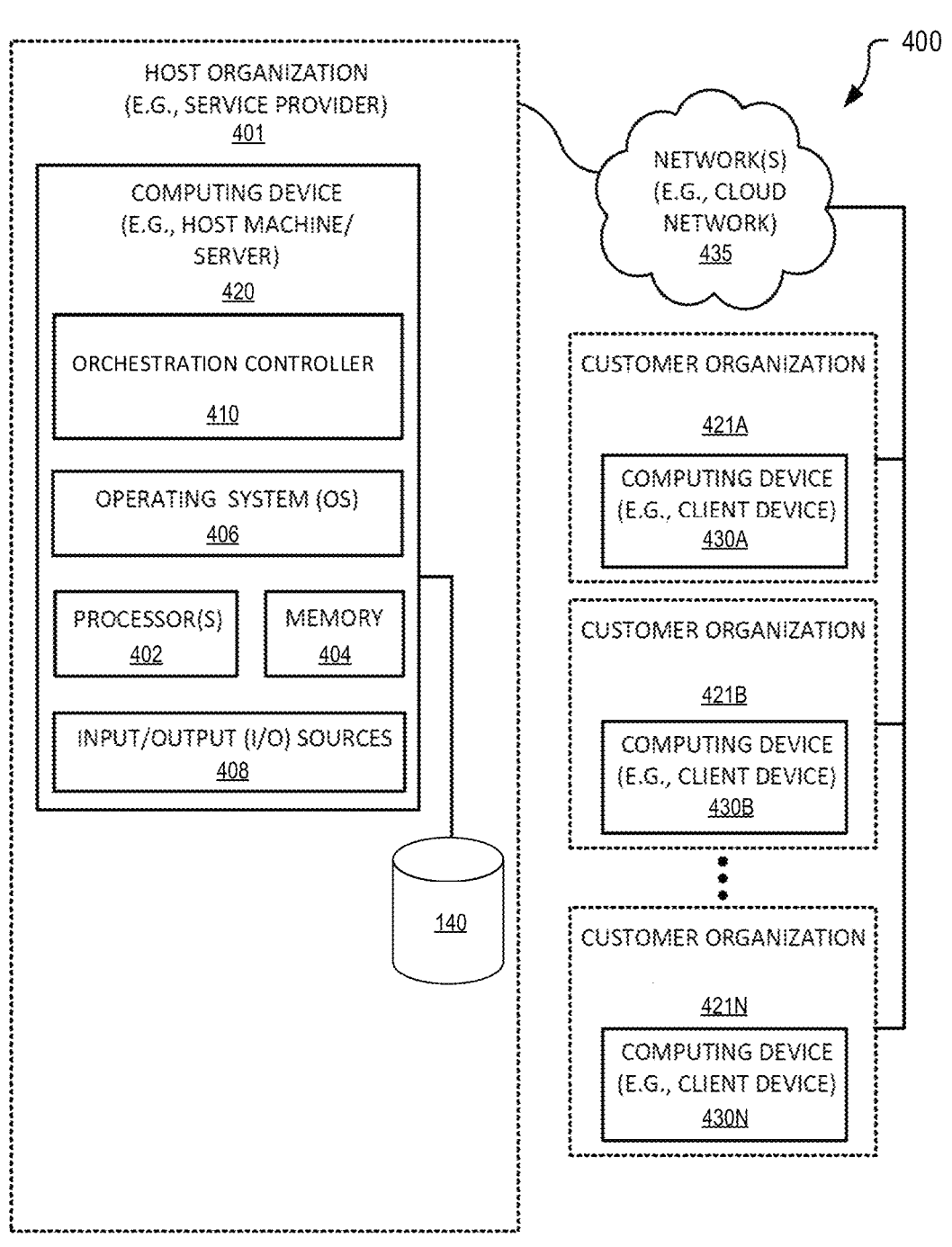
FIG. 4 illustrates one embodiment of a system.

FIG. 4 illustrates one embodiment of a system 400 having a computing device 420 employing a container orchestration controller (or controller) 410. In one embodiment, container orchestration enables automated deployment, configuration, coordination and management of multi-container workloads in a containerized architecture. As shown in FIG. 4, computing device 420 includes a host server computer serving as a host machine for employing controller 410 to facilitate a provisioning of cluster life-cycles (e.g., public and private) accessible by customer organizations 421 via a platform as a service (PaaS) or infrastructure as a service (IaaS). Computing device 420 may include (without limitation) server computers (e.g., cloud server computers, etc.), desktop computers, cluster-based computers, set-top boxes (e.g., Internet-based cable television set-top boxes, etc.), etc. Computing device 420 includes an operating system ("OS") 406 serving as an interface between one or more hardware/physical resources of computing device 420 and one or more client devices 430A-430N, etc. Computing device 420 further includes processor(s) 402, memory 404, input/output ("I/O") sources 408, such as touchscreens, touch panels, touch pads, virtual or regular keyboards, virtual or regular mice, etc.

In one embodiment, host organization 101 may further employ a production environment that is communicably interfaced with client devices 430A-N through host organization 101. Client devices 430A-N may include (without limitation) customer organization-based server computers, desktop computers, laptop computers, mobile computing devices, such as smartphones, tablet computers, personal digital assistants, e-readers, media Internet devices, smart televisions, television platforms, wearable devices (e.g., glasses, watches, bracelets, smartcards, jewelry, clothing items, etc.), media players, global positioning system-based navigation systems, cable setup boxes, etc.

In one embodiment, the illustrated database(s) 140 store (without limitation) information and underlying database records having customer and user data therein on to process data on behalf of customer organizations 421A-N. In some embodiments, host organization 101 receives input and other requests from a plurality of customer organizations 421A-N over one or more networks 435; for example, incoming data, or other inputs may be received from customer organizations 421A-N to be processed using database system 140.

In one embodiment, each customer organization 421A-N is an entity selected from a group consisting of a separate and distinct remote organization, an organizational group within host organization 101, a business partner of host organization 101, a customer organization 421A-N that subscribes to cloud computing services provided by host organization 101, etc.

In one embodiment, requests are received at, or submitted to, a web server within host organization 101. Host organization 101 may receive a variety of requests for processing by host organization 101. For example, incoming requests received at the web server may specify services from host organization 101 are to be provided. Further, host organization 101 may implement a request interface via the web server or as a stand-alone interface to receive requests packets or other requests from the client devices 430A-N. The request interface may further support the return of response packets or other replies and responses in an outgoing direction from host organization 101 to one or more client devices 430A-N.

In one embodiment, computing device 420 may include a server computer that may be further in communication with one or more databases or storage repositories, such as database(s) 140, which may be located locally or remotely over one or more networks, such as network(s) 435 (e.g., cloud network, Internet, proximity network, intranet, Internet of Things ("IoT"), Cloud of Things ("CoT"), etc.). Computing device 420 is further shown to be in communication with any number and type of other computing devices, such as client computing devices 430A-N, over one or more networks, such as network(s) 435.

In one embodiment, computing device 420 may serve as a service provider core for hosting and maintaining controller 410 as a SaaS or TaaS, and be in communication with one or more client computers 430A-N, over one or more network (s) 435, and any number and type of dedicated nodes. In such an embodiment, host organization 101 implements orchestration controller 410 to operate as a control plane during deployment and at runtime, to perform tasks such as carving out infrastructure resources needed for microservices to run and allocate the tasks to the different microservices based on their specific need or adapting to different load conditions.

Figure 5:
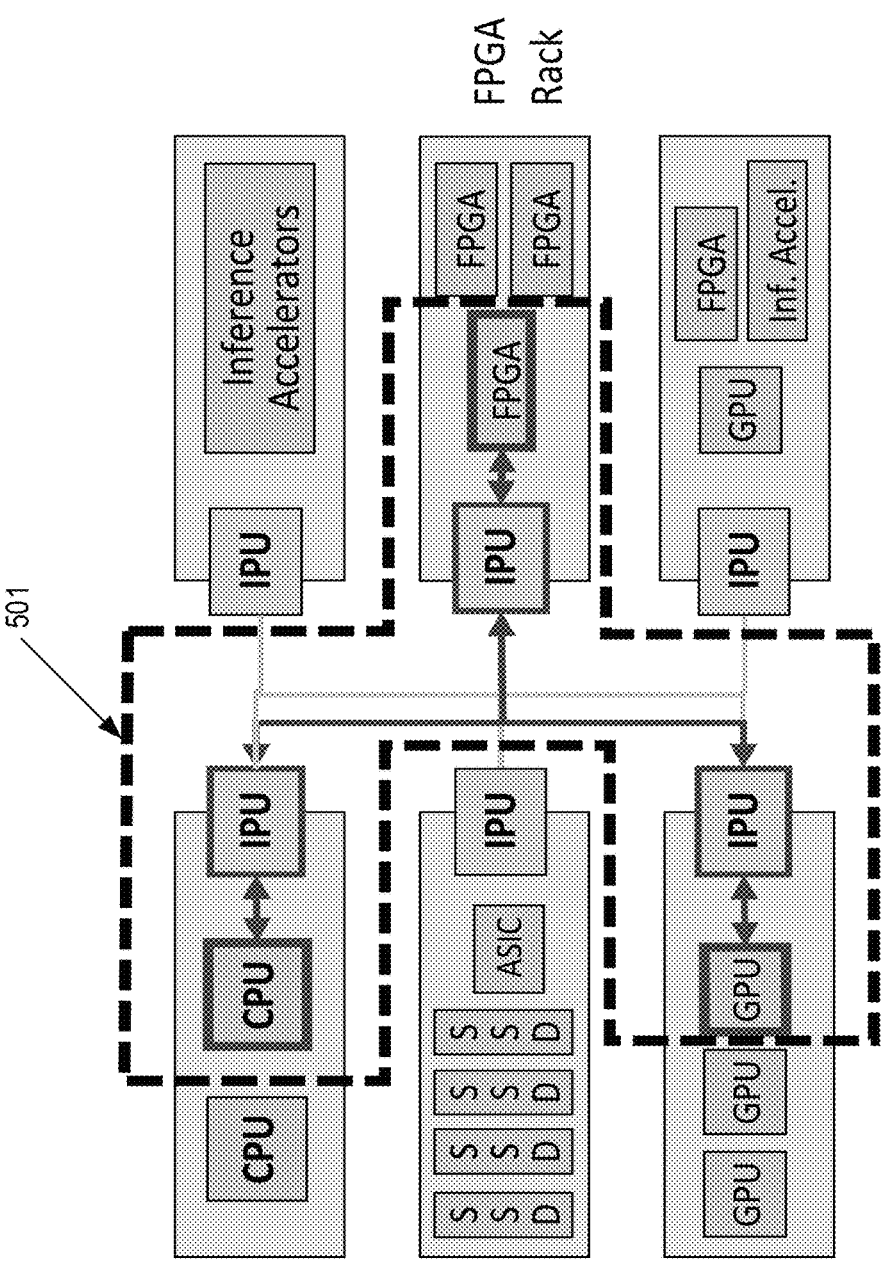
FIG. 5 illustrates one embodiment of a data center.

FIG. 5 illustrates one embodiment of a data center. As shown in FIG. 5, the data center configuration includes traditional servers, racks of FPGAs, GPUs and storage devices, all of which are connected by infrastructure processing unit (IPUs). In one embodiment, IPUs comprise smart network interface cards (NICs) that not only perform traditional networking functions, but also has additional responsibilities in the control and management of infrastructure. Block 501 represents a represents a single workload spanning disaggregated compute resources within the data center. As defined herein, a workload comprises services and resources (e.g., storage, network, compute, etc.) implemented to execute an application.

Another major trend in computing has been the growth of microservices based applications replacing monolithic applications. A microservice architecture loosely defines coupled services that collaborate to perform a larger function and are developed, deployed and managed independently. For ease of development, deployment and management of microservices, technologies such as Containers and Orchestrators (such as Kubernetes) are widely used.

Figure 6:
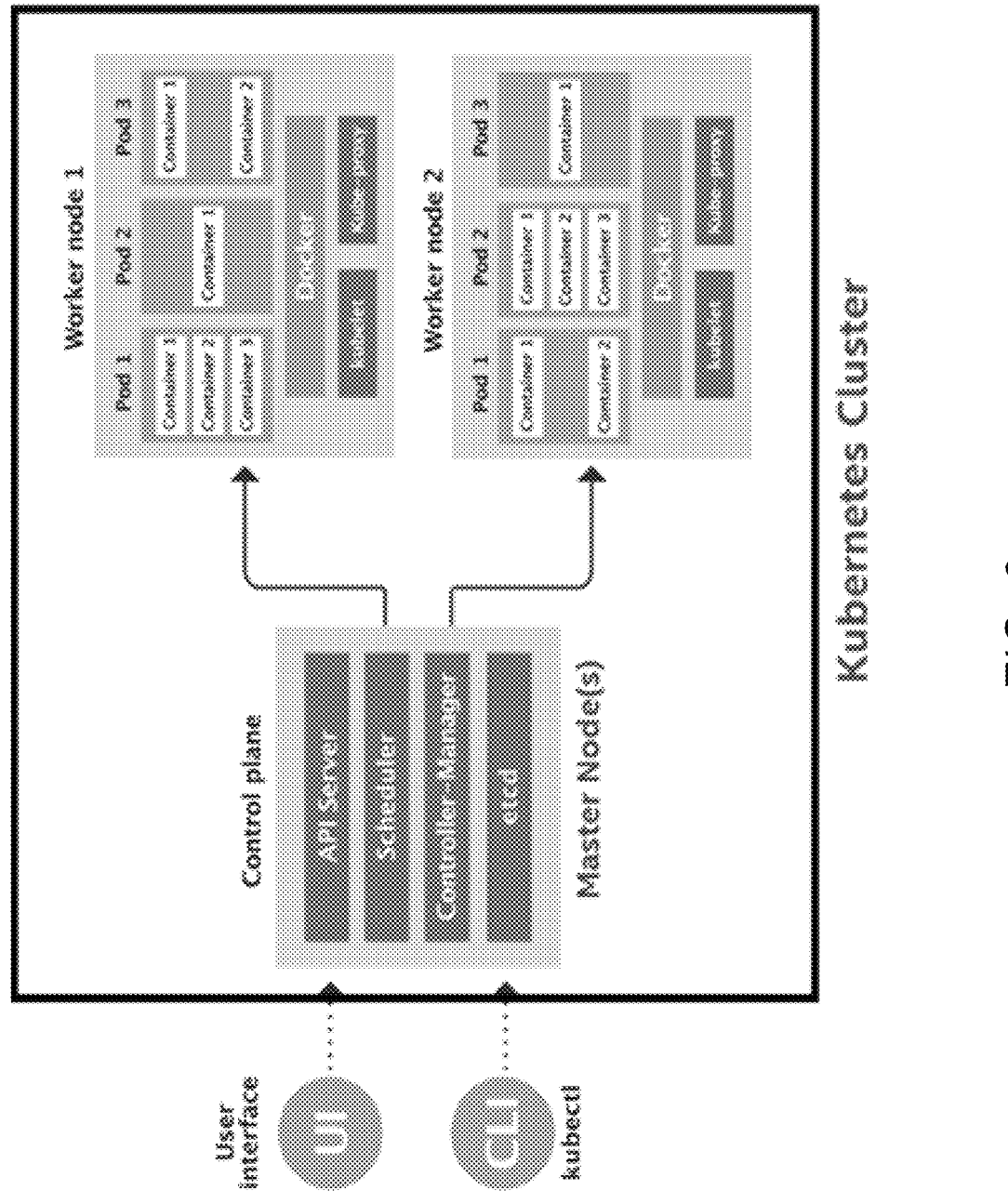
FIG. 6 illustrates one embodiment of a cluster.

FIG. 6 illustrates one embodiment of a Kubernetes cluster. Kubernetes provides a cluster management platform implemented for automating deployment, scaling, and operations of application containers across clusters of hosts. Kubernetes systems include various object types that define a set of primitives (e.g., containers, pods and clusters). Containers are packages that rely on virtual isolation to deploy and run applications that access a shared OS. Pods provide a higher level of abstraction that includes a group of containers that are guaranteed to be co-located on the same host machine to share resources. Containers within a pod can reference all other containers in the pod. A cluster includes two or more pods, in which each pod is assigned a unique pod identifier ID). Although described herein with regards to a Kubernetes system, other embodiments may feature an implementation of different types of container orchestration architectures (e.g., Docker, Mesos, etc.).

Currently, an orchestrator has prior knowledge of available hardware resources through initial static provisioning steps, and upon demand carves out requested resources from a static pool of resources for use by a given microservice. Additionally, the orchestrator maintains a static inventory of worker machines (e.g., that were provisioned) and allocates the worker machines from a static pool whenever a microservice requests resources. However, multiple problems exist in disaggregated computing in which the compute resources are distributed, and the availability is dynamic.

Figures 7A, 7B:
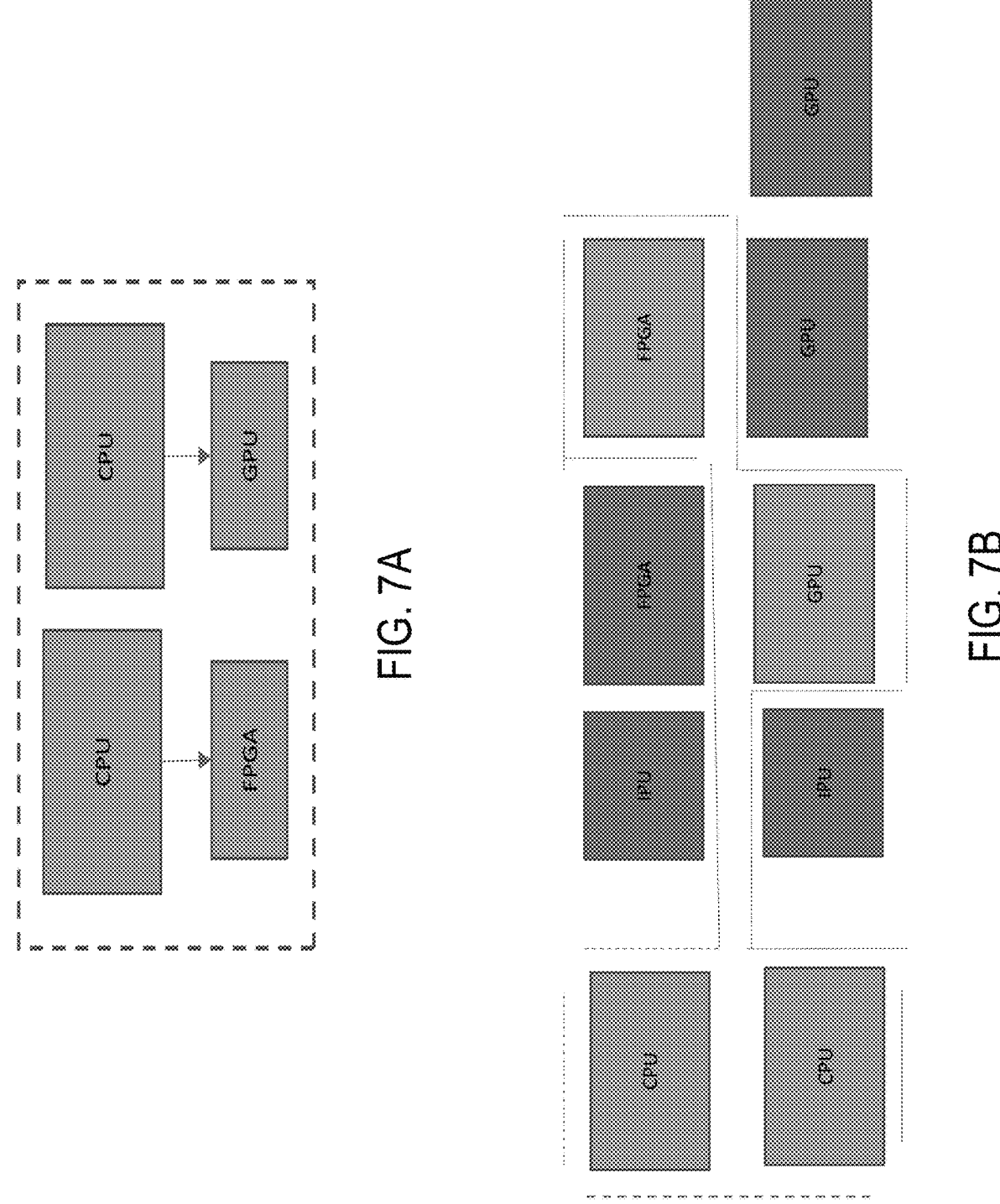
FIG. 7A illustrates a conventional platform.
FIG. 7B illustrates one embodiment of a dynamically composed platform.

One problem is that current orchestrators cannot dynamically compose a platform of disaggregated hardware resources per customer requirement, or be provisioned to have knowledge of available pool of resources (e.g., CPUs, GPUs, FPGAs, storage, memory), where the resources are located, how to allocate the resources, how to setup communications amongst the resources, etc. Another problem is that the orchestrator is not currently enabled to dynamically create a worker machine that is composed of disaggregated hardware resources as requested by a microservice. FIG. 7A illustrates a conventional platform in which an orchestrator statically composes.

According to one embodiment, an infrastructure manager is provided to enable dynamic platform composition for allocation to a microservices cluster. In such an embodiment, the infrastructure manager dynamically constructs the platform during a provisioning phase via IPUs attached to the disaggregated resources. Dynamic composability enables a cloud service provider (CSP) to construct a platform on the fly based on available resources in a data center. FIG. 7B illustrates one embodiment of a dynamically composed platform. As shown in FIG. 7B, the platform includes a mix and match of resources, as opposed to the fixed resources shown in FIG. 7A.

In a further embodiment, runtime orchestration by orchestrion controller 110 enables dynamic composing/configuration of a worker node. In this embodiment, orchestration controller 110 schedules a microservice on a suitable worker node during deployment based on the worker node requirements provided by the microservice. In a further embodiment, a microservice includes a manifest file describing resource requirements (e.g., 4 GPUs, 2 CPU cores, 1 GB of storage, etc.). Thus, orchestration controller 110 may construct a worker node by combining network connected resources in many different ways, which provides enhanced flexibility to use the resources most efficiently. A worker node is defined as an infrastructure resource on which a microservice is operating.

Figure 8:
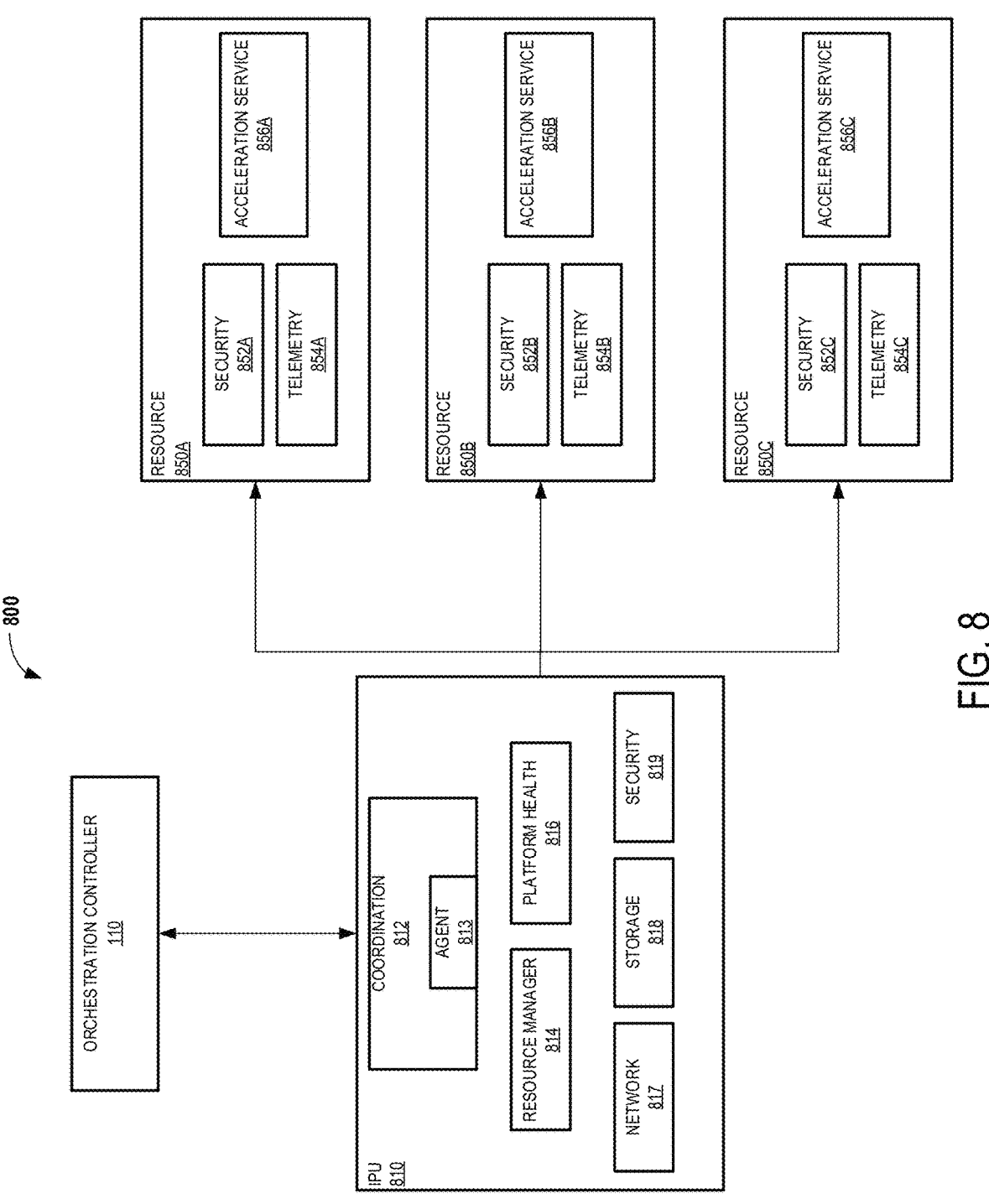
FIG. 8 illustrates one embodiment of a data center platform.

FIG. 8 illustrates another embodiment of a platform 800 including orchestration controller 110, IPU 810 and a plurality of data center resources 850 (e.g., 850A-850C). According to one embodiment, platform 800 comprises a microservice control plane and data plane. As used herein, a control plane refers to a combined role of the orchestration controller 110 and IPU 810 in performing resource discovery, worker node configuration, composition of resources, establishing routing and communication, etc., while the data plane refers to the movement of between various resources in a cluster data during runtime.

In one embodiment, IPU 810 enables discovery of resources, and performs management, scheduling and configuration functions. Additionally, IPU 810 reports information associated with a resource (or the resources information), such as type, capabilities, security features, availability etc., to a central infrastructure manager at orchestration controller 110. As shown in FIG. 8, IPU 810 includes coordination logic 812, resource manager 814, platform health logic 816, network 817, storage 818 and security engine 819.

Coordination logic 812 provides coordination with orchestration controller 110. In one embodiment, coordination logic 812 coordinates resource discovery, allocation, scheduling, load balancing, performance management, etc. with orchestration controller 110. Resource manager 814 facilitates the management of resources at resources 850. Platform health logic 816 maintains platform health statistics (e.g., key performance indicators (KPIs) usage status, etc.) via monitoring and telemetry. Security engine 819 provides attestation for platform (e.g., including IPU 810 and one or more resources 850).

Figure 9:
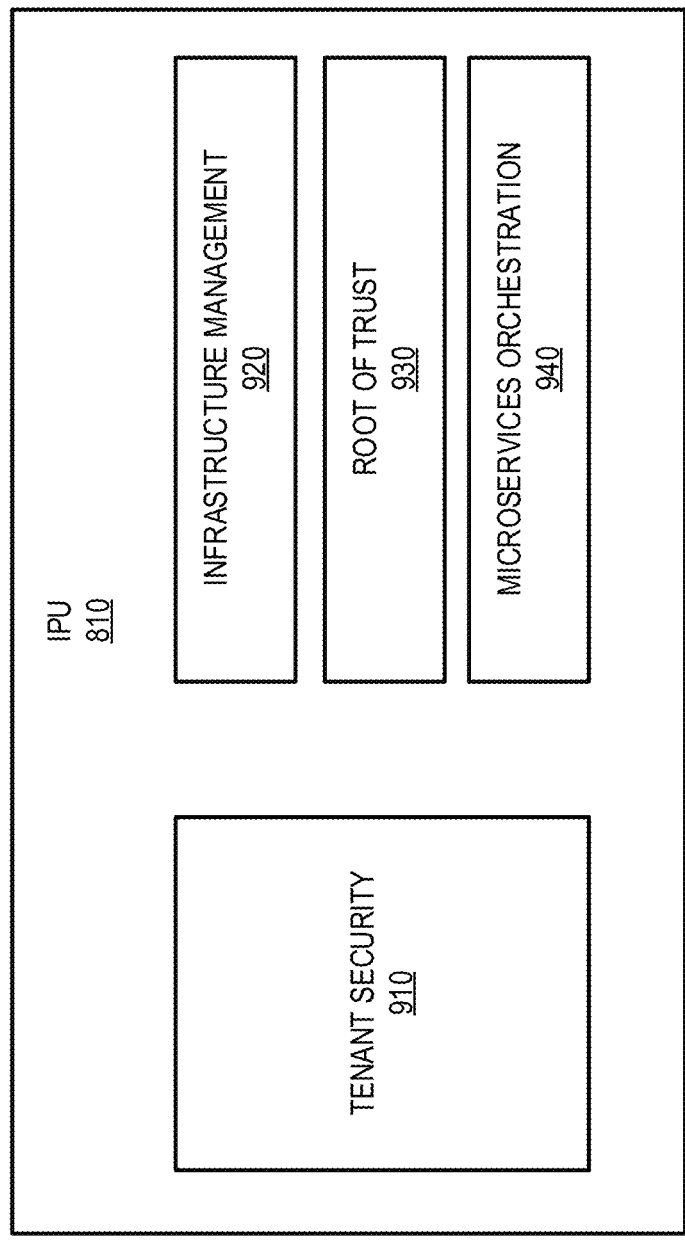
FIG. 9 illustrates one embodiment of an infrastructure processing unit.

FIG. 9 illustrates another embodiment of IPU 810. As shown in FIG. 9, the security architecture of IPU 810 provides isolation of a customer's control and data plane, via tenant security 910, from being accessed by infrastructure management 920. Additionally, the infrastructure management 920 control and data is protected from networking components associated with a tenant. In a further embodiment, IPU 810 includes a root of trust 930 that protects infrastructure management 920 to secure startup and attest to the entire platform 800 environment. IPU 810 also includes microservices orchestration 940 that provides for orchestration of resource 850 resources. As a result, orchestration occurs at IPU 810, rather than at a CPU. In yet a further embodiment, microservices orchestration 940 may logically partition each resource 850 into sub-accelerators.

Referring back to FIG. 8, resources 850 provide acceleration resource services 98 (e.g., 856A-856C), such as GPUs, CPUs, FPGAs, storage, etc.). In one embodiment, resources 850 each include a telemetry engine 854 (e.g., 854A-854C) to perform telemetry services to collect measurement data associated with the use of acceleration services 856. Resources 850 also provide a standard set of interfaces to enable running microservices securely at arbitrary granularity and with QoS assurance. Thus, each resource 850 includes a security engine 852 (e.g., 852A-852C) that provides for attestation to prove the authenticity and integrity of the resource 850. Additionally, security engine 852 creates a trusted isolation of arbitrary granularity to match the resources requested by a microservice, such as an acceleration service 856. Security engine 852 also facilitates trusted peer-to-peer communication to enable larger microservice that span resources 850.

Figure 10:
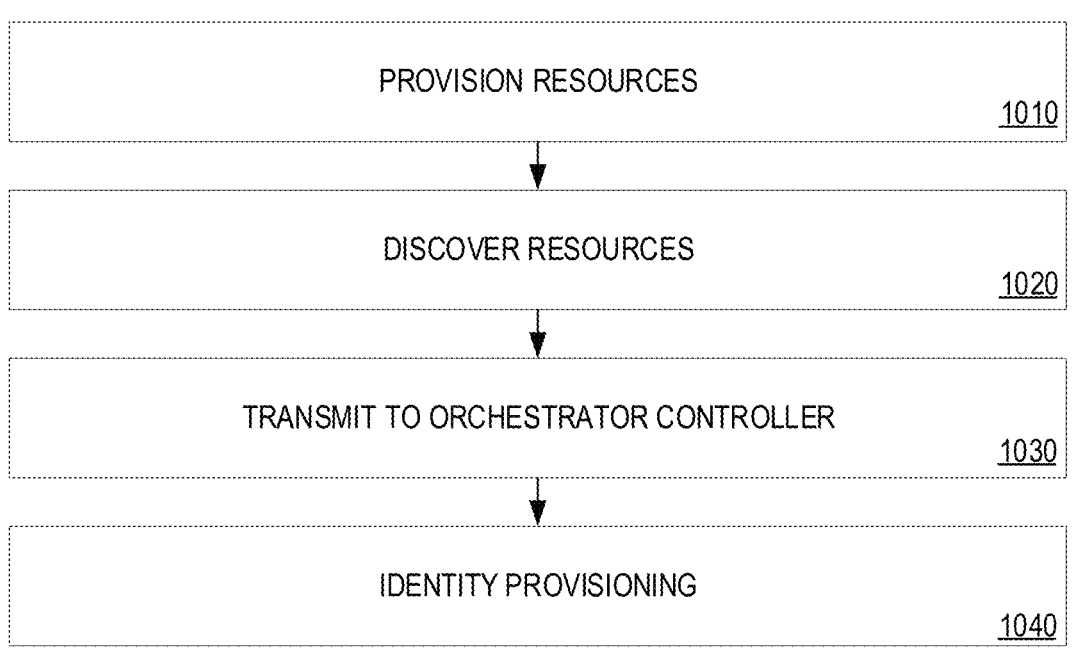
FIG. 10 is a flow diagram illustrating one embodiment of a cluster setup process.

FIG. 10 is a flow diagram illustrating one embodiment of a microservices cluster setup process. At processing block 1010, a cluster administrator introduces and provisions new resources in one or more clusters. In one embodiment, this process comprises setting up one or more resources (e.g., GPU, FPGA, CPU, storage, etc.) within a rack and interfacing the resources with IPU 810. At processing block 1020, IPU 810 discovers and enumerates the resources. In one embodiment, IPU 810 also authenticates and attests the resources via security engine 819 and a security engine 825 at the resources. In a further embodiment, IPU 810 sets up a long-term secure communication session with a manager at each resource 850 and assigns unique internet protocol (IP) address endpoints.

At processing block 1030, a report of the resource capabilities, long-term secure communication sessions and IP address endpoints are transmitted to orchestration controller 410. Subsequently, orchestration controller 410 updates its state to reflect the presence of the new resources within the cluster. In one embodiment, orchestration controller 410 may have network (e.g., out-of-band or in-band management) through which it works together with various IPUs 810 to track how many resources are in use, as well as their health. At processing block 1040, identity and certificates provisioning of the resources 850 is performed by interacting with a secure processing element within a resource 850.

Figure 11:
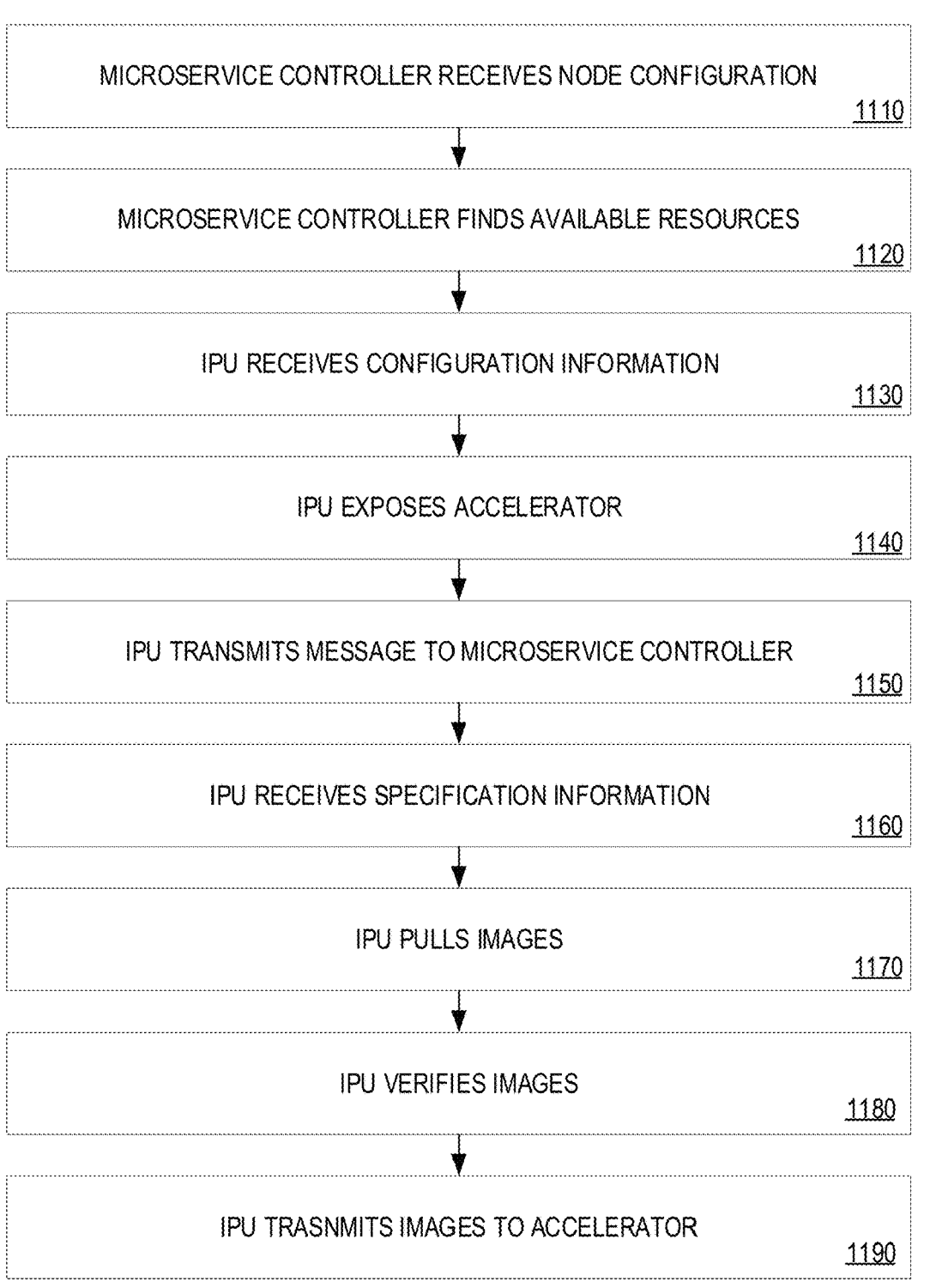
FIG. 11 is a flow diagram illustrating one embodiment of a process for composing a node.

FIG. 11 is a flow diagram illustrating one embodiment of a process for composing a node. At processing 1110, a developer (e.g., microservice developer) provides a worker node configuration to orchestration controller 410 in the form of a manifest. In one embodiment, the manifest lists a type of resources that is needed, attributes related to the resource, details regarding the workload that will execute on the resources, as well as other metadata. In current implementations, manifests include information regarding a containerized application image and where the image may be located (e.g., in a registry or a local store). According to one embodiment, registries are provided within each accelerator to store configuration information (e.g., bitstreams of FPGAs, compute kernels for GPUs, etc.).

At processing block 1120, orchestration controller 410 finds available resources within the platform. In one embodiment, orchestration controller 410 examines the available resources based on a persistent cluster state, and schedules the corresponding resources by interacting with a node agent 813 within coordination logic 812 of IPU 810. IPU node agents 813 are control plane components that communicate with orchestration controller 410. In one embodiment, node agents 813 operate as endpoints with which orchestration controller 410 may communicate for management related functions. In such an embodiment, a node agent 813 may listen for new requests from the orchestration controller 410 (e.g., via out of band or in-band management). In a further embodiment, orchestration controller 410 assigns an identifier (or composed platform ID) to a resource and creates a mapping to individual resource IDs. Further, orchestration controller 410 removes the resource IDs from an available resources pool. Accordingly, orchestration controller 410 returns a failure message in instances in which a resource requested by a manifest is not available.

Figure 12A:
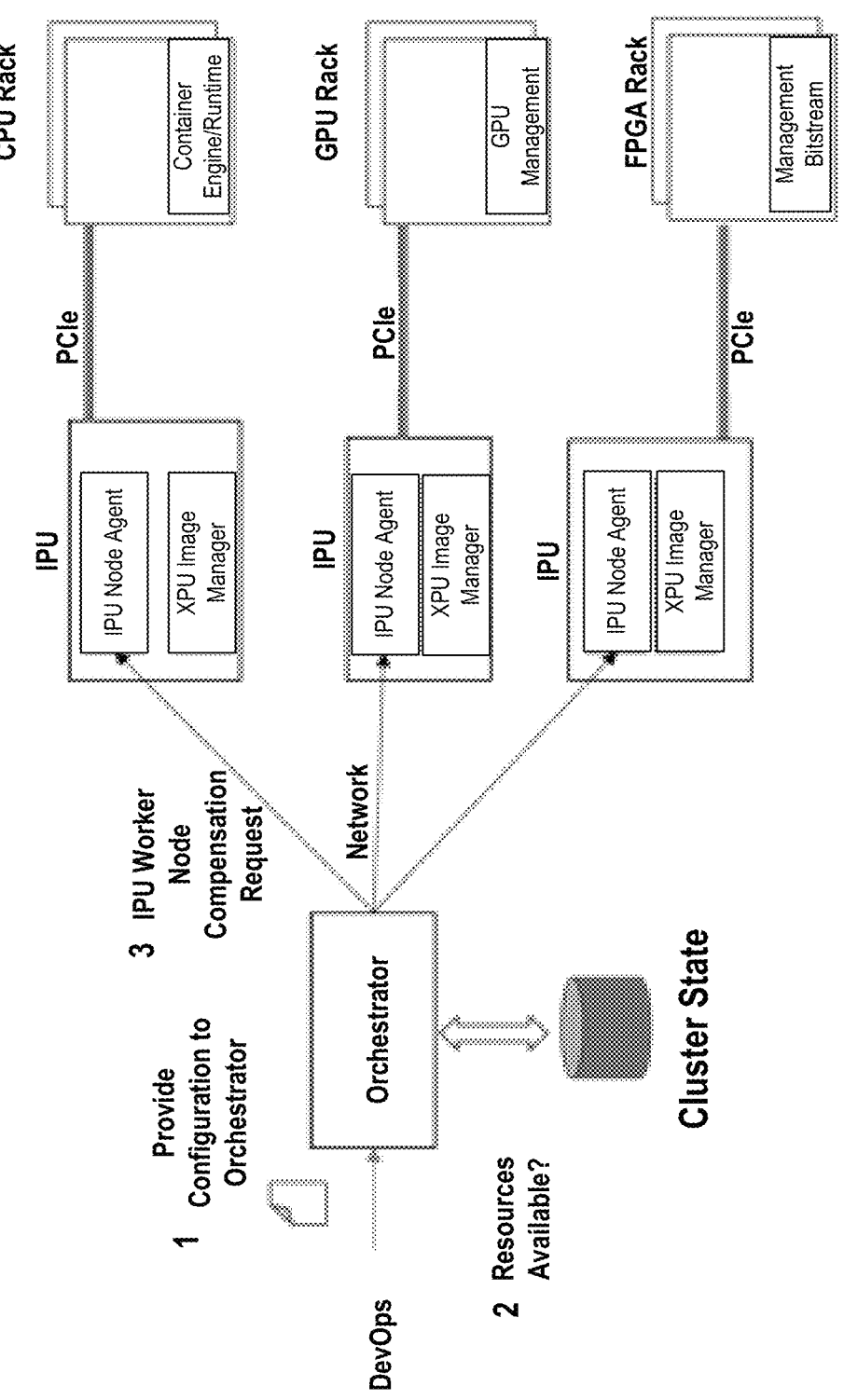
FIGS. 12A-12C illustrate embodiments of a platform during composing of a node.

At processing block 1130, a node agent 813 having a corresponding platform ID and resource ID to be allocated receives a configuration file including configuration information from orchestration controller 410 during a scheduling process. In one embodiment, the configuration file provides details (e.g., on how to reach the other endpoint, like an IP address, port number) regarding each IPU node agent 813 involved in configuring the composable platform. In a further embodiment, IPU 810 managing CPU resources operates as a master, and establishes mutually authenticated secure channels with the IPUs having the other resource 850 resources. In yet a further embodiment, this master IPU 810 requests for virtualized resource 850 endpoint objects from the other IPUs 810. FIG. 12A illustrates one embodiment of the platform after receipt of the worker node configuration request at an IPU 810 from orchestration controller 410.

13

Figure 12B:
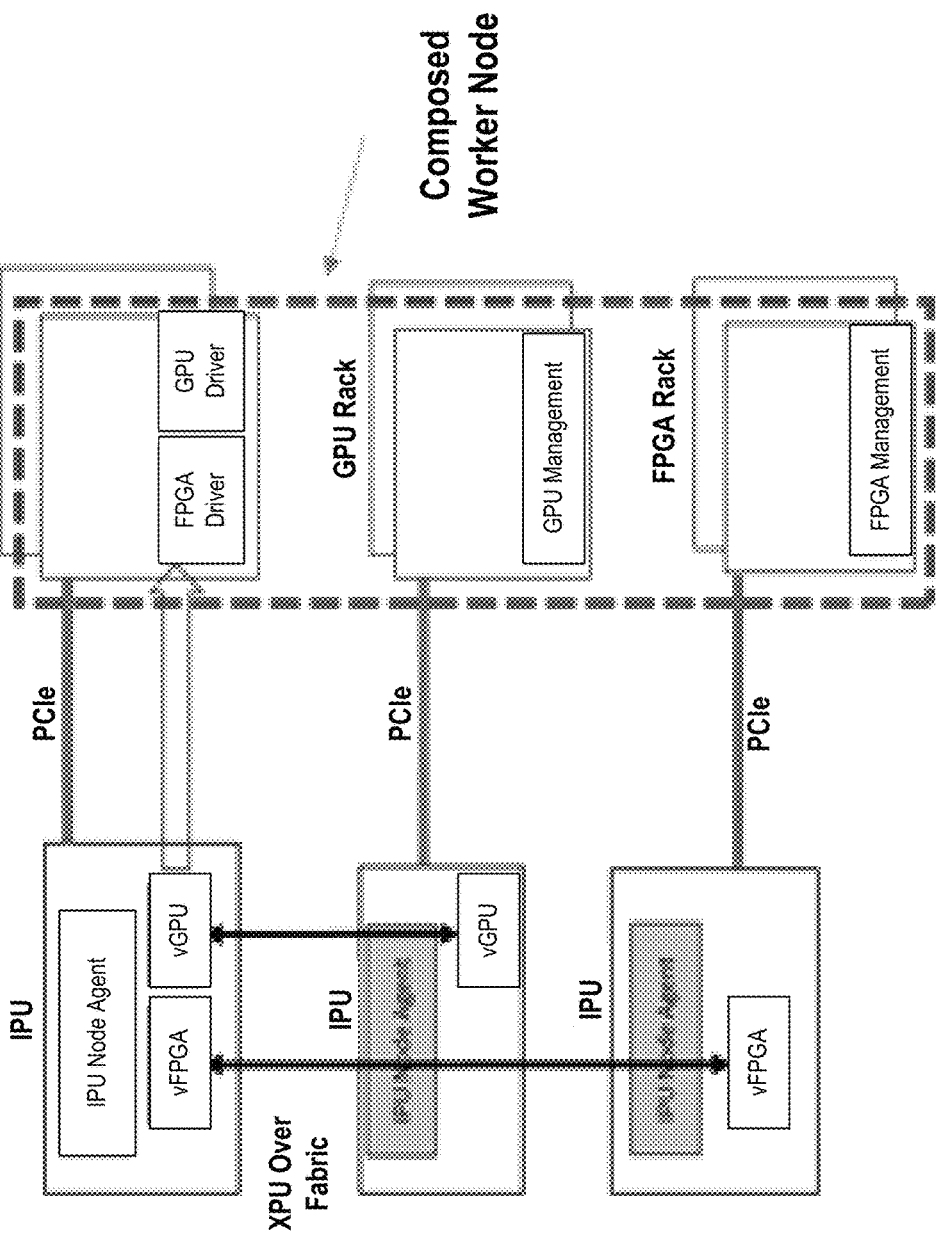

At processing block 1140, the master IPU 810 exposes the virtualized resource 850 endpoint as a hot-pluggable PCIe device that is enumerated on a CPU platform. In one embodiment, the actual translation (e.g., from CPU platform←PCIe→Custom protocol (such as accelerator over fabric)←PCIe→accelerator) is handled transparently by the IPUs. It's designed as a protocol similar to NVMe over Fabric—XPU over Fabric that encapsulates the underlying transfer mechanisms. FIG. 12B illustrates one embodiment of the platform after a virtualized accelerator endpoint gas been exposed.

At processing block 1150, an IPU 810 transmits a message to orchestration controller 410 informing that the worker node has been successfully composed. At processing block 1160, an IPU 810 receives the specification for an execution environment for a microservice from orchestration controller 410. At processing block 1170, an IPU 810 communicates with a registry to retrieve one or more images associated with the configuration information included in the configuration file. In one embodiment, an image comprises container images, bitstreams, configuration information, etc.

Figure 12C:
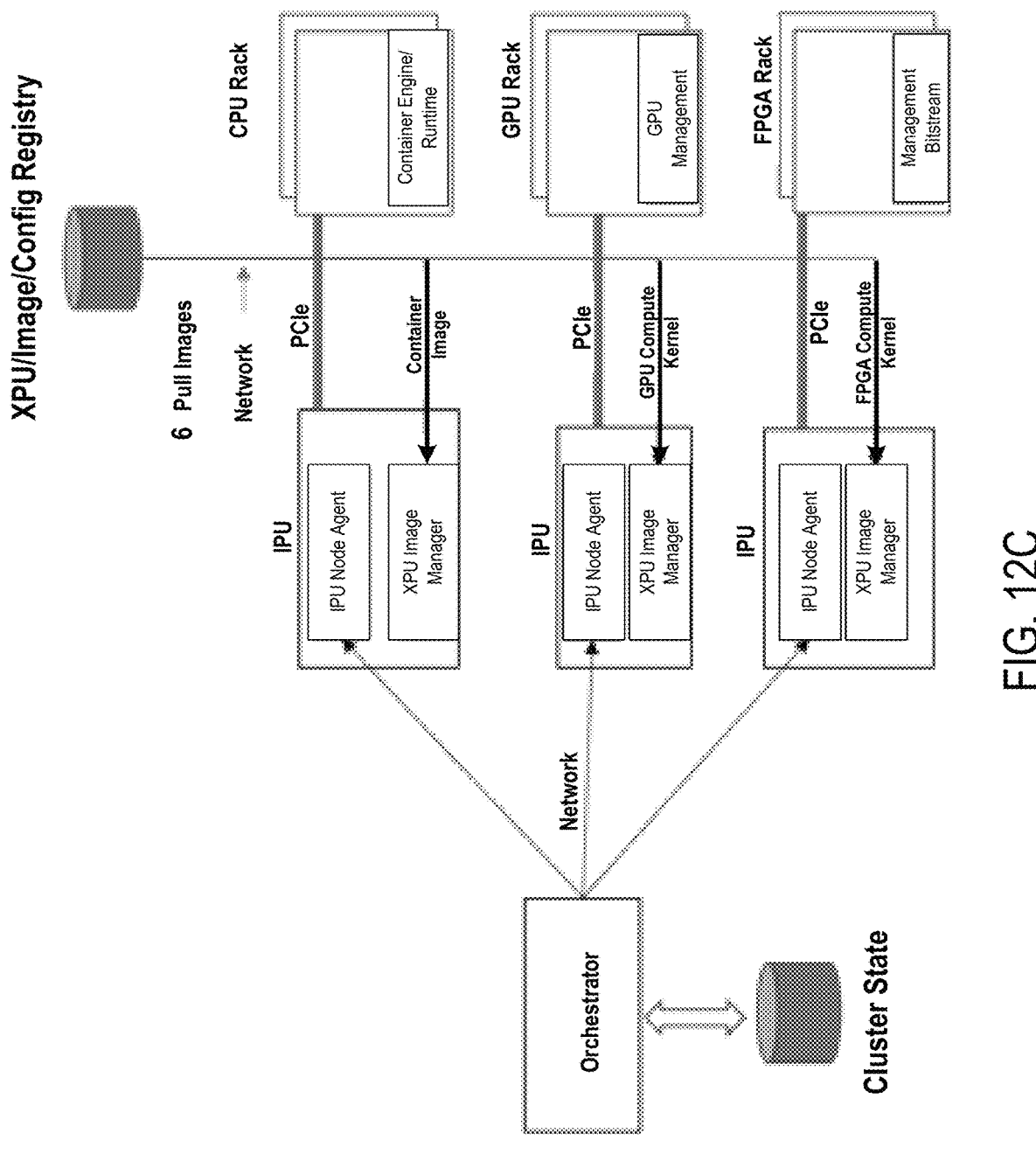

At processing block 1180, IPU verifies the image. In one embodiment, the IPU verifies the image by verifying the image signature, and decrypting and inspecting the image for potentially malicious code. FIG. 12C illustrates one embodiment of the platform after images have been pulled by each IPU 810. At processing block 1190, an IPU 810 transfers the respective images to the resource 850 management bitstream, where the resource 850 creates an execution environment based on the provided image.

Illustrative examples of the technologies disclosed herein are provided below. An embodiment of the technologies may include any one or more, and any combination of, the examples described below.

Example 1 includes an apparatus comprising a plurality of disaggregated data center resources and an infrastructure processing unit (IPU), communicatively coupled to the plurality of resources, to compose a platform of the plurality of disaggregated data center resources for allocation of microservices cluster.

Example 2 includes the subject matter of Example 1, further comprising an orchestration controller, communicatively coupled to the IPU, to compose the platform via the IPU during a provisioning phase.

Example 3 includes the subject matter of any of Examples 1-2, wherein the orchestration controller schedules a microservice at one or more of the disaggregated data center resources via the IPU based on resource requirements provided by the microservice.

Example 4 includes the subject matter of any of Examples 1-3, wherein the IPU discovers and performs management of the plurality of disaggregated data center resources.

Example 5 includes the subject matter of any of Examples 1-4, wherein the IPU reports information associated with each of the plurality of disaggregated data center resources to the orchestration controller.

Example 6 includes the subject matter of any of Examples 1-5, wherein the IPU authenticates and attests the plurality of disaggregated data center resources.

Example 7 includes the subject matter of any of Examples 1-6, wherein the IPU establishes a communication session with each of the plurality of disaggregated data center resources.

Example 8 includes the subject matter of any of Examples 1-7, wherein the IPU receives a configuration file including configuration information from the orchestration controller during a scheduling process.

Example 9 includes the subject matter of any of Examples 1-8, wherein the IPU exposes a virtualized resource endpoint at a disaggregated data center resource.

Example 10 includes the subject matter of any of Examples 1-9, wherein the IPU transmits a message to the orchestration controller indicating that a disaggregated data center resource has been composed and receives a specification for an execution environment for a microservice from the orchestration controller.

Example 11 includes the subject matter of any of Examples 1-10, wherein the IPU retrieves one or more images associated with the configuration information included in the configuration file from a registry and transfers the one or more images to a disaggregated data center resource.

Example 12 includes a method comprising performing provisioning at an infrastructure processing unit (IPU) to compose a platform of the plurality of disaggregated data center resources for allocation of microservices cluster and performing orchestration to compose one or more of the disaggregated data center resources via the IPU based on resource requirements provided by the microservice Example 13 includes the subject matter of Example 12, wherein performing the provisioning comprises the IPU discovering and managing of the plurality of disaggregated data center resources.

Example 14 includes the subject matter of any of Examples 12-13, wherein performing the provisioning further comprises the IPU reporting information associated with each of the plurality of disaggregated data center resources to the orchestration controller.

Example 15 includes the subject matter of any of Examples 12-14, wherein performing the provisioning further comprises the IPU authenticating the plurality of disaggregated data center resources, the IPU attesting the plurality of disaggregated data center resources and the IPU establishing a communication session with each of the plurality of disaggregated data center resources.

Example 16 includes the subject matter of any of Examples 12-15, wherein performing the orchestration comprises scheduling a microservice at one or more of the disaggregated data center resources via the IPU based on resource requirements provided by the microservice.

Example 17 includes the subject matter of any of Examples 12-16, wherein performing the orchestration further comprises the IPU receiving a configuration file including configuration information from an orchestration controller, transmitting a message to the orchestration controller indicating that a disaggregated data center resource has been composed; and receiving a specification for an execution environment for a microservice from the orchestration controller.

Example 18 includes the subject matter of any of Examples 12-17, wherein performing the orchestration further comprises the IPU retrieving one or more images associated with the configuration information included in the configuration file from a registry and transferring the one or more images to a disaggregated data center resource.

Example 19 includes a method comprising wherein performing the orchestration further comprises the IPU retrieving one or more images associated with the configuration information included in the configuration file from a registry and transferring the one or more images to a disaggregated data center resource.

Example 20 includes the subject matter of Example 19, wherein the resource management circuitry discovers and performs management of the plurality of disaggregated data center resources.

Example 21 includes the subject matter of any of Examples 19-20, wherein the resource management circuitry reports information associated with each of the plurality of disaggregated data center resources to the orchestration controller.

Example 22 includes the subject matter of any of Examples 19-21, wherein the resource management circuitry establishes a communication session with each of the plurality of disaggregated data center resources.

Example 23 includes the subject matter of any of Examples 19-22, wherein the coordination circuitry receives a configuration file including configuration information from the orchestration controller during a scheduling process.

Example 24 includes at least one computer readable medium having instructions stored thereon, which when executed by one or more processors, cause the processors to perform provisioning at an infrastructure processing unit (IPU) to compose a platform of the plurality of disaggregated data center resources for allocation of microservices cluster and perform orchestration to compose one or more of the disaggregated data center resources via the IPU based on resource requirements provided by the microservice.

The above Detailed Description includes references to the accompanying drawings, which form a part of the Detailed Description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In addition, "a set of" includes one or more elements. In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," "third," etc. are used merely as labels, and are not intended to suggest a numerical order for their objects.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and examples are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and examples are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and examples are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular examples, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one example" or "some examples" means that a particular feature, structure, or characteristic described in connection with the example is included in at least an implementation. The appearances of the phrase "in one example" in various places in the specification may or may not be all referring to the same example.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with each claim standing on its own as a separate embodiment. The scope of the embodiments disclosed herein is to be determined with reference to the appended claims, along with the full scope of equivalents to which such claims are entitled.

Although examples have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus comprising:

processing circuitry coupled to a memory, the processing circuitry to facilitate network interface circuitry to:

provision disaggregated data center resources for allocation of a microservice cluster;

compose one or more of the disaggregated data center resources to schedule a microservice, wherein to provision comprises to discover and manage the disaggregated data center resources;

receive a configuration file including configuration information from the orchestration controller and transmit a message to the orchestration controller indicating that a disaggregated data center resource has been composed; and receive a specification for an execution environment for the microservice from the orchestration controller.

2. The apparatus of claim 1, wherein provisioning further comprises reporting information associated with the disaggregated data center resources to an orchestration controller.

3. The apparatus of claim 1, wherein provisioning further comprises authenticating and attesting the disaggregated data center resources, and wherein provisioning further comprises establishing a communication session with the disaggregated data center resources.

4. The apparatus of claim 1, wherein the network interface circuitry is further facilitated to receive one or more images associated with the configuration information included in the configuration file from a registry and transfer the one or more images to a disaggregated data center resource, wherein the processing circuitry comprises one or more of application processing circuitry or graphics processing circuitry.

5. A method comprising:

provisioning, by network interface circuitry as facilitated by processing circuitry of a computing device, disaggregated data center resources for allocation of a microservice cluster;

composing one or more of the disaggregated data center resources to schedule a microservice, wherein provisioning comprises discovering and managing of the disaggregated data center resources;

receiving a configuration file including configuration information from the orchestration controller and transmitting a message to the orchestration controller indicating that a disaggregated data center resource has been composed; and receiving a specification for an execution environment for the microservice from the orchestration controller.

6. The method of claim 5, wherein provisioning further comprises reporting information associated with the disaggregated data center resources to an orchestration controller.

7. The method of claim 5, wherein provisioning further comprises:

authenticating and attesting the disaggregated data center resources; and establishing a communication session with the disaggregated data center resources.

8. The method of claim 5, further comprising:

receiving one or more images associated with the configuration information included in the configuration file from a registry;

transferring the one or more images to a disaggregated data center resource, wherein the processing circuitry comprises one or more of application processing circuitry or graphics processing circuitry.

9. At least one computer-readable medium having stored thereon instructions which, when executed, cause a computing device to perform operations comprising:

provisioning, by network interface circuitry as facilitated by processing circuitry of the computing device, disaggregated data center resources for allocation of a microservice cluster;

composing one or more of the disaggregated data center resources to schedule a microservice, wherein provisioning comprises discovering and managing of the disaggregated data center resources;

receiving a configuration file including configuration information from the orchestration controller and transmitting a message to the orchestration controller indicating that a disaggregated data center resource has been composed; and receiving a specification for an execution environment for the microservice from the orchestration controller.

10. The computer-readable medium of claim 9, wherein provisioning further comprises reporting information associated with the disaggregated data center resources to an orchestration controller.

11. The computer-readable medium of claim 9, wherein provisioning further comprises:

authenticating and attesting the disaggregated data center resources; and establishing a communication session with the disaggregated data center resources.

12. The computer-readable medium of claim 9, wherein the operations further comprise:

receiving one or more images associated with the configuration information included in the configuration file from a registry;

transferring the one or more images to a disaggregated data center resource, wherein the processing circuitry comprises one or more of application processing circuitry or graphics processing circuitry.

* * * * *